United States Patent
Morrill, Jr.

(10) Patent No.: US 8,141,390 B2
(45) Date of Patent: Mar. 27, 2012

(54) METHOD FOR CONTINUOUSLY FORMING OPTICAL FIBER CONNECTOR GLASS AND OTHER CLOSE TOLERANCE TUBES

(75) Inventor: Vaughan Morrill, Jr., St. Louis, MO (US)

(73) Assignee: Quantum Quartz, LLC, St. Louis, MO (US)

( * ) Notice: Subject to any disclaimer, the term of this patent is extended or adjusted under 35 U.S.C. 154(b) by 0 days.

(21) Appl. No.: 12/897,781

(22) Filed: Oct. 4, 2010

(65) Prior Publication Data

US 2011/0016925 A1    Jan. 27, 2011

Related U.S. Application Data

(63) Continuation of application No. 10/591,211, filed as application No. PCT/US2005/007532 on Mar. 4, 2005, now Pat. No. 7,805,963.

(60) Provisional application No. 60/550,464, filed on Mar. 4, 2004.

(51) Int. Cl.
*C03B 37/022* (2006.01)
*C03B 37/025* (2006.01)
*C03B 37/07* (2006.01)

(52) U.S. Cl. ............... 65/382; 65/401; 65/439

(58) Field of Classification Search ........ 65/102, 65/292, 377, 401, 439, 494, 540, 86, 393, 65/382, 477, 491; 414/14; 264/177.14, 177.15; 29/888.452, DIG. 11
See application file for complete search history.

(56) References Cited

U.S. PATENT DOCUMENTS

| | | | |
|---|---|---|---|
| 2,613,479 A | 10/1952 | Stong | |
| 2,852,891 A * | 9/1958 | George | ............ 65/85 |
| 3,078,695 A | 2/1963 | Kozak et al. | |
| 3,146,082 A | 8/1964 | Hicks, Jr. et al. | |
| 3,401,028 A | 9/1968 | Morrill, Jr. | |
| 3,410,675 A | 11/1968 | Dockerty | |
| 3,467,513 A | 9/1969 | Dockerty | |
| 3,689,679 A * | 9/1972 | Niwa et al. | ............ 65/135.7 |
| 4,078,909 A | 3/1978 | Dietzsch et al. | |
| 4,120,630 A * | 10/1978 | LaSpisa et al. | ............ 425/142 |
| 4,350,513 A | 9/1982 | Coucoulas et al. | |
| 4,372,771 A | 2/1983 | Coucoulas et al. | |

(Continued)

FOREIGN PATENT DOCUMENTS

FR    2818634    6/2002

OTHER PUBLICATIONS

International Search Report and Written Opinion from corresponding International Application No. PCT/US05/07532, mailed Jun. 8, 2005.

*Primary Examiner* — Matthew Daniels
*Assistant Examiner* — Erin Snelting
(74) *Attorney, Agent, or Firm* — Polster, Lieder, Woodruff & Lucchesi, L.C.

(57) ABSTRACT

A method and device for making high precision glass tubes. A glass rod is pushed into a heated chamber and the tube is pulled from the chamber. Preferably, both the push rate and the pull rate are controlled. Fiber optic glass ferrules and other components manufactured by the use of this invention have precision dimensions that fall well within the tight dimensional tolerances required for ferrules and others.

18 Claims, 13 Drawing Sheets

U.S. PATENT DOCUMENTS

| | | |
|---|---|---|
| 4,389,574 A | 6/1983 | Shofner et al. |
| 4,850,670 A | 7/1989 | Mathis et al. |
| 5,295,213 A | 3/1994 | Ueda et al. |
| 5,314,517 A | 5/1994 | Koening et al. |
| 5,540,746 A | 7/1996 | Sasaki et al. |
| 6,098,428 A | 8/2000 | Bogdahn et al. |
| 6,128,926 A | 10/2000 | Senapati et al. |
| 6,250,112 B1 | 6/2001 | Kerdoncuff |
| 6,810,691 B2 | 11/2004 | Fagan et al. |
| 6,938,442 B1 | 9/2005 | Schmitt et al. |
| 2002/0066292 A1* | 6/2002 | Wang .............................. 65/382 |

* cited by examiner

METHOD FOR CONTINUOUSLY FORMING OPTICAL FIBER CONNECTOR GLASS AND OTHER CLOSE TOLERANCE TUBES

CROSS REFERENCE TO RELATED APPLICATIONS

This application is a continuation of U.S. application Ser. No. 10/591,211, filed Aug. 31, 2006, now U.S. Pat. No. 7,805,963, which is a national stage application under 35 U.S.C. §371 of International application No. PCT/US05/07532, filed Mar. 4, 2005, which claims the benefit of U.S. Provisional application Ser. No. 60/550,464, filed Mar. 4, 2004, all of which are hereby incorporated by reference.

TECHNICAL FIELD

This invention relates to the production of high precision glass articles for optical fiber connectors and for other uses, and to a method of manufacture and a machine for carrying out the method.

BACKGROUND ART

Previous methods for making high precision glass tubing employ the well-known redraw technique in which a close tolerance redraw blank tube is drawn down to a smaller size on a mandrel to make such articles as glass ferrules. See for instance U.S. Pat. Nos. 4,850,670, 5,295,213, 5,314,517, 6,098,428, and 6,810,691.

In all of the various redraw processes, the dimensional characteristics of the tubular starting blanks substantially control all of the final dimensions of the redrawn tubing. Such things as roundness, concentricity of inner bore to outer diameter and the ratio of inner bore size to the outer diameter can not be changed during redraw, and as a consequence, the greatest proportion of the cost to make redraw tubing lies in the original blank preparation costs and the very inefficient batch type non-continuous redraw operation.

My previous method of making high precision glass tubing, described in U.S. Pat. No. 3,401,028, employs bulky and expensive equipment and generally is incapable of forming glass tubing having the high precision required for many modern applications, such as the manufacture of glass ferrules or connectors for optical fibers. These applications may require precise inside and outside dimensions, wall thickness, roundness, and concentricity, all measured in nanometers, for example one hundred nanometers or less, sometimes ten nanometers or less.

Other methods of forming glass tubing are shown in U.S. Pat. Nos. 4,350,513 and 4,372,771.

The patents mentioned above are hereby incorporated by reference.

SUMMARY OF THE INVENTION

The present invention provides a method whereby a high precision redraw blank is not used, but rather commercial grade round glass rod is used as the starting material. The rod may be continuously drawn or in cut lengths. This invention provides a way to feed, extrude and pull molten glass tubing and rod under pressure from a die. Errors in all the critical dimensions of the resulting product may, if desired, be continuously corrected by an automatic feedback system. As a result of this ability to change dimensions on the fly, it is no longer necessary to build into the starting material extremely costly high precision dimensional characteristics.

The elimination of a high precision starting blank and the ability to run continuously eliminates as much as 90% or more of the cost of making redraw tubing and gives a large commensurate improvement in the high precision size tolerances.

The articles made by continuously drawing glass tubing according to this invention, are controlled for outside diameter, inside diameter, roundness, wall thickness and axial center of inside diameter in relation to the outside diameter by both automatic and manually adjusted parameters.

Both hollow and solid glass articles can be manufactured by utilizing the teachings of the instant invention. Single bore and double bore, as well as multi-bore tubing for such applications as fiber optic connector ferrules and sleeves and photonic band gap materials can be made with tolerances measured in nanometers, typically less than 100 nanometers, sometimes on the order of ten nanometers.

BEST MODES FOR CARRYING OUT THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in this description or shown in the accompanying drawings shall be interpreted as illustrative and not in a limiting sense.

Figure 1:
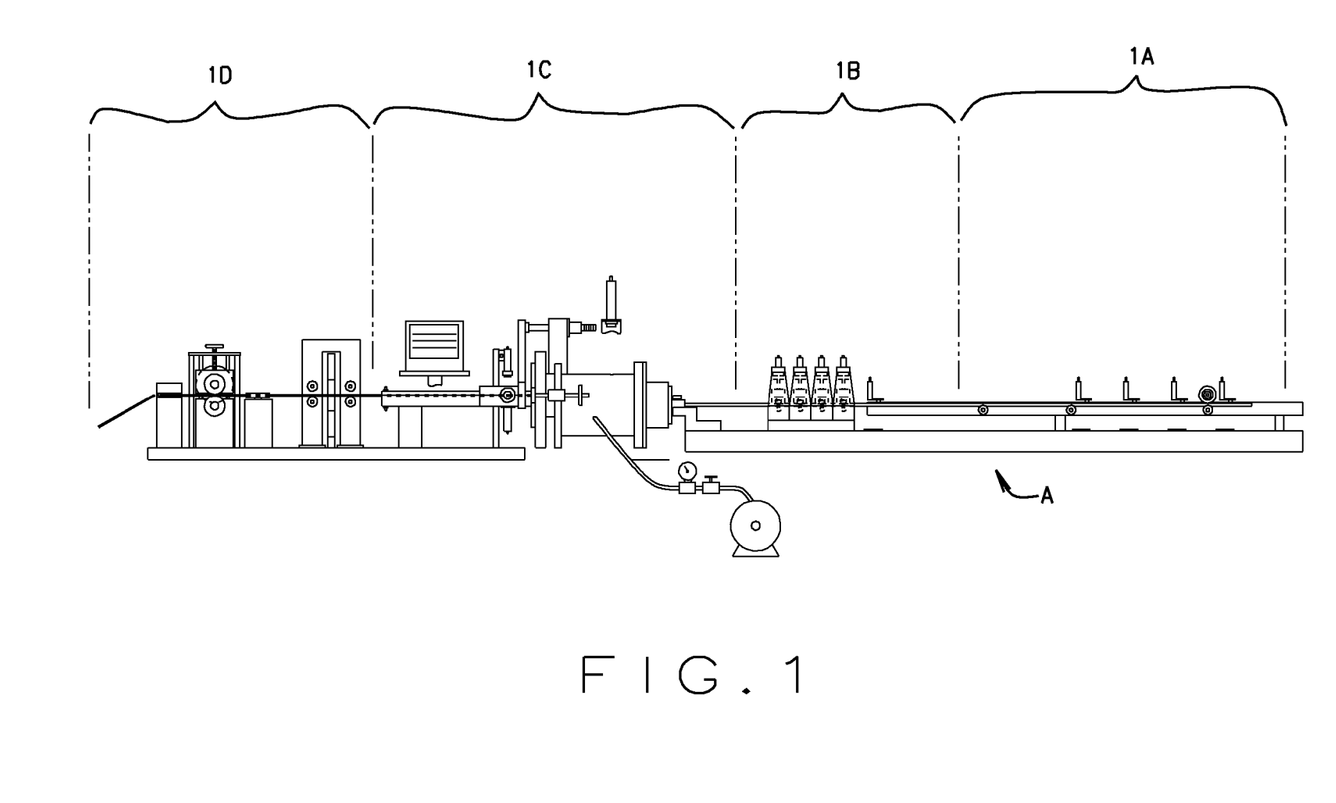
FIG. 1 is an overall view in side elevation of one illustrative embodiment of apparatus according to the invention for carrying out one illustrative embodiment of the methods of the invention.

Referring now to the drawings, FIG. 1 shows one illustrative embodiment of an apparatus A in accordance with the present invention, for use in carrying out illustrative embodiments of methods of the present invention. The device is shown in more detail in FIGS. 1A-1D, each showing a portion of the device of FIG. 1.

Figure 1A:
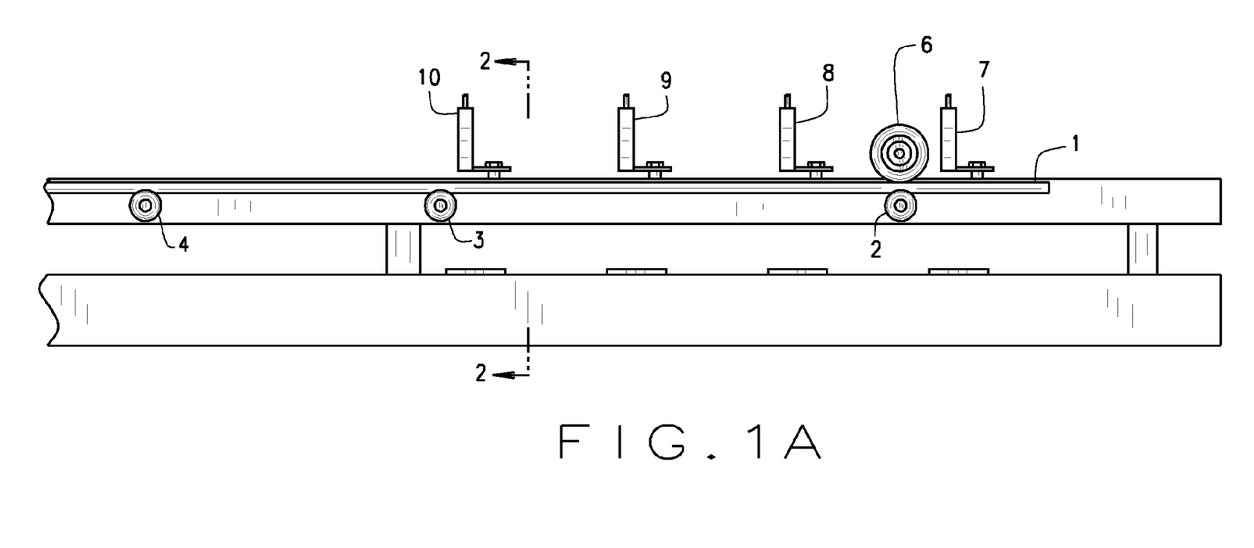
FIG. 1A is a view in side elevation of a rod holding system portion of the apparatus of FIG. 1.
Figures 1B, 3, 4, 4A:
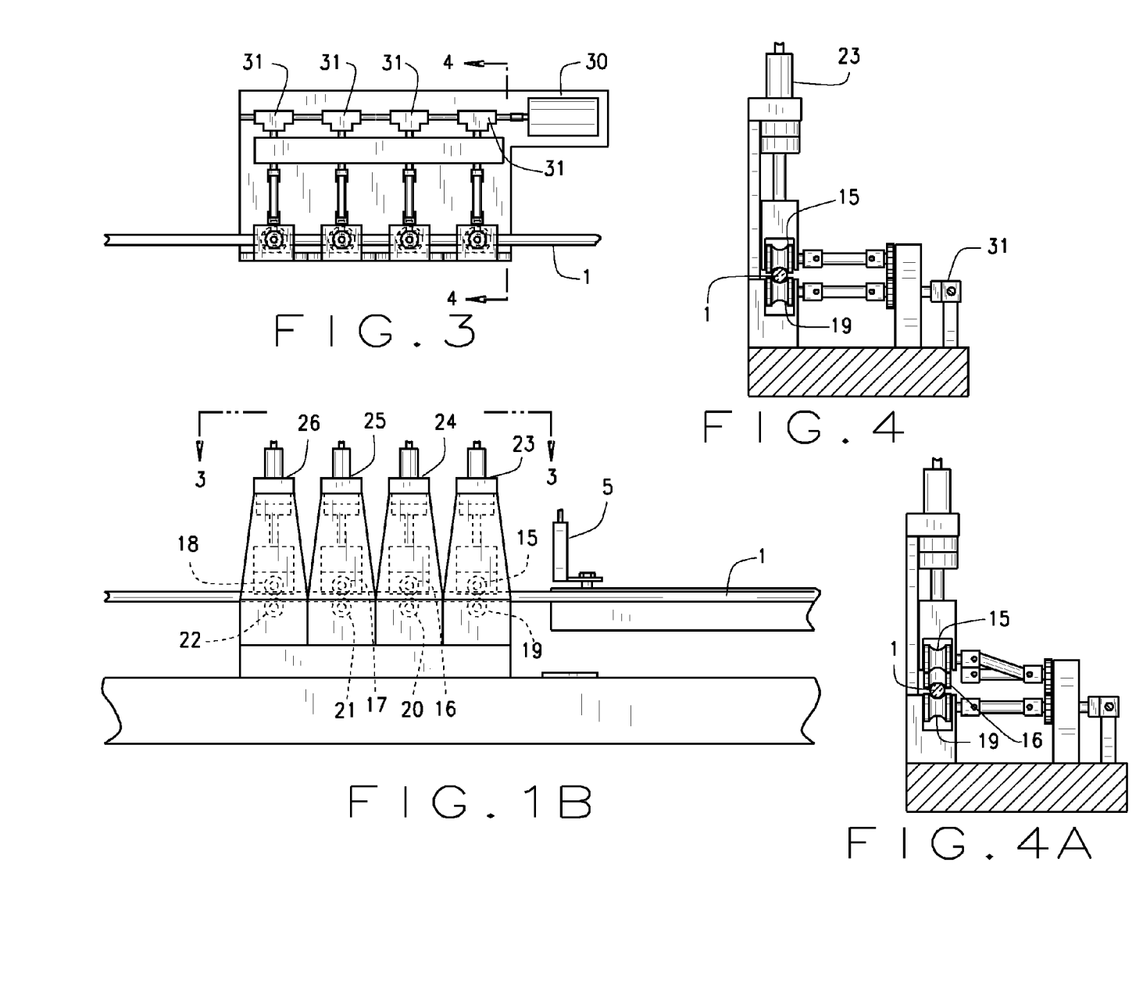
FIG. 1B is a view in side elevation of a rod feeder portion of the apparatus of FIG. 1.
FIG. 3 is a top view of the rod feeder shown in FIG. 1B.
FIG. 4 is a cross-section taken along line 4-4 of FIG. 3.
FIG. 4A is a cross-section corresponding to FIG. 4, showing an upper drive roller in a raised position.
Figure 1C:
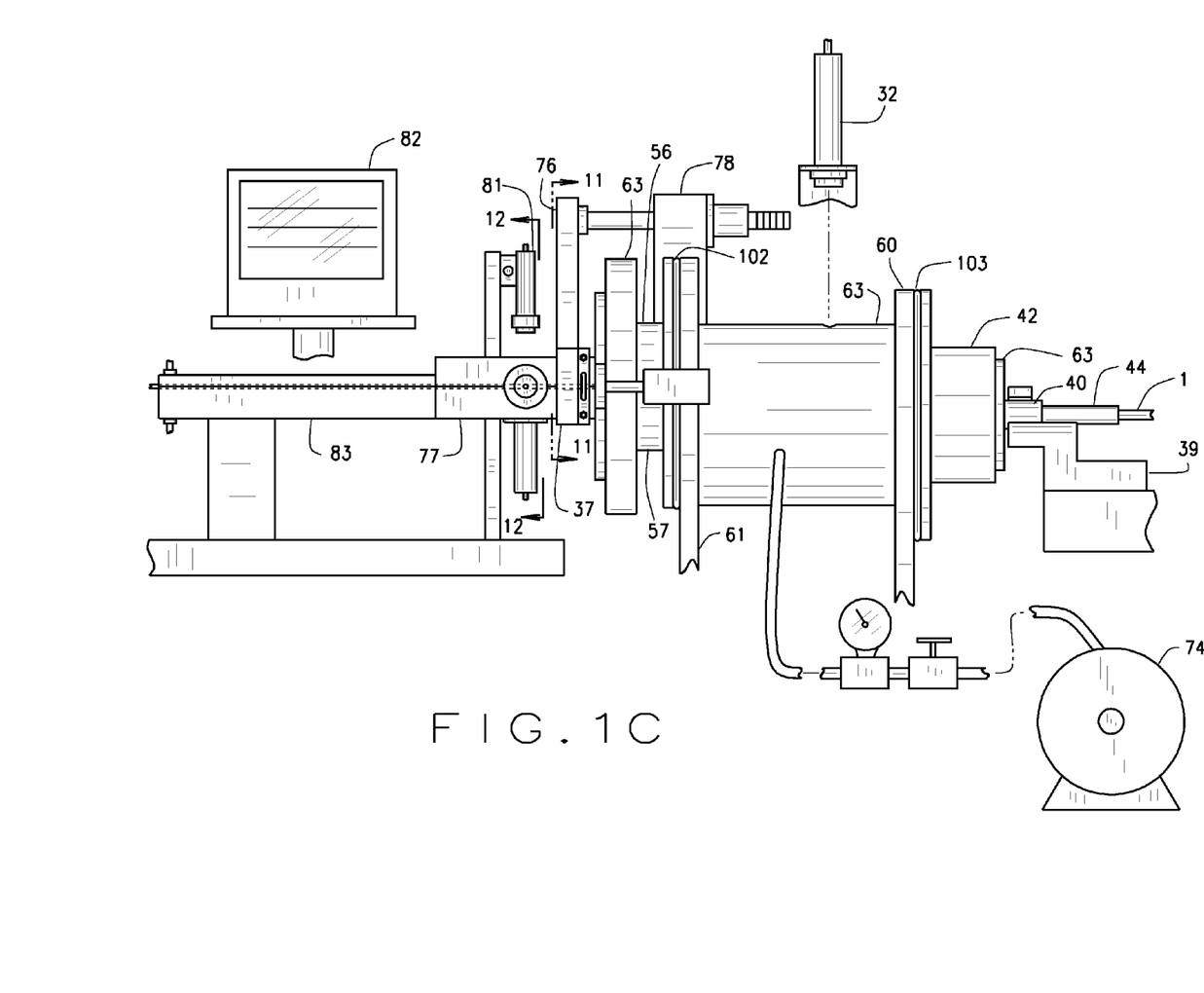
FIG. 1C is a view in side elevation of a melting chamber and forming system portion of the apparatus of FIG. 1.
Figure 1D:
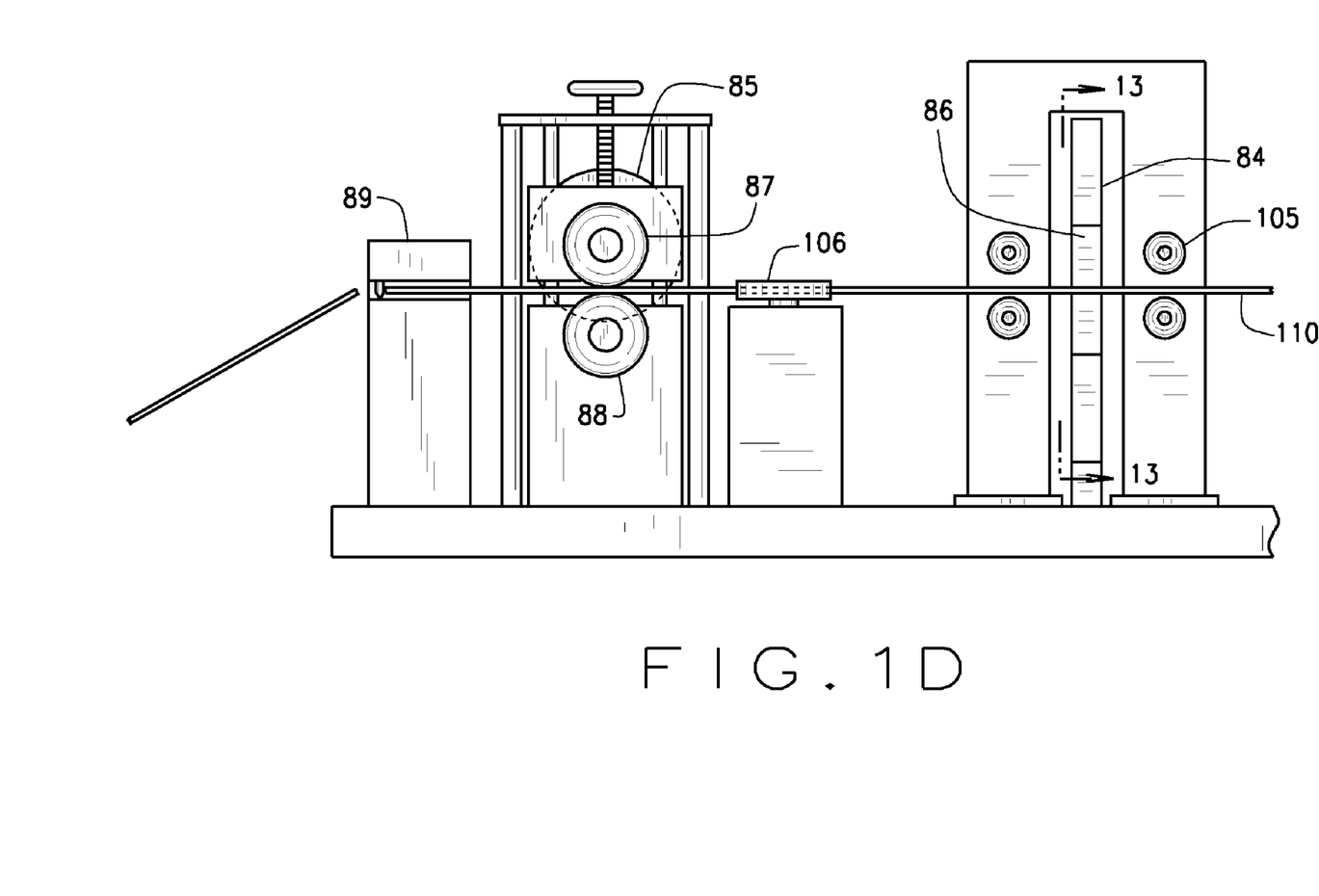
FIG. 1D is a view in side elevation of a pulling system portion of the apparatus of FIG. 1.
Figure 2:
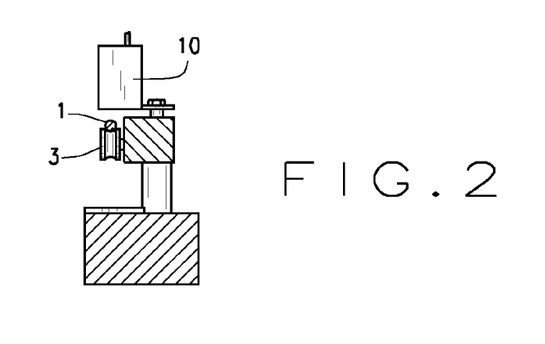
FIG. 2 is a cross-section taken along line 2-2- of FIG. 1A.
Figure 5:
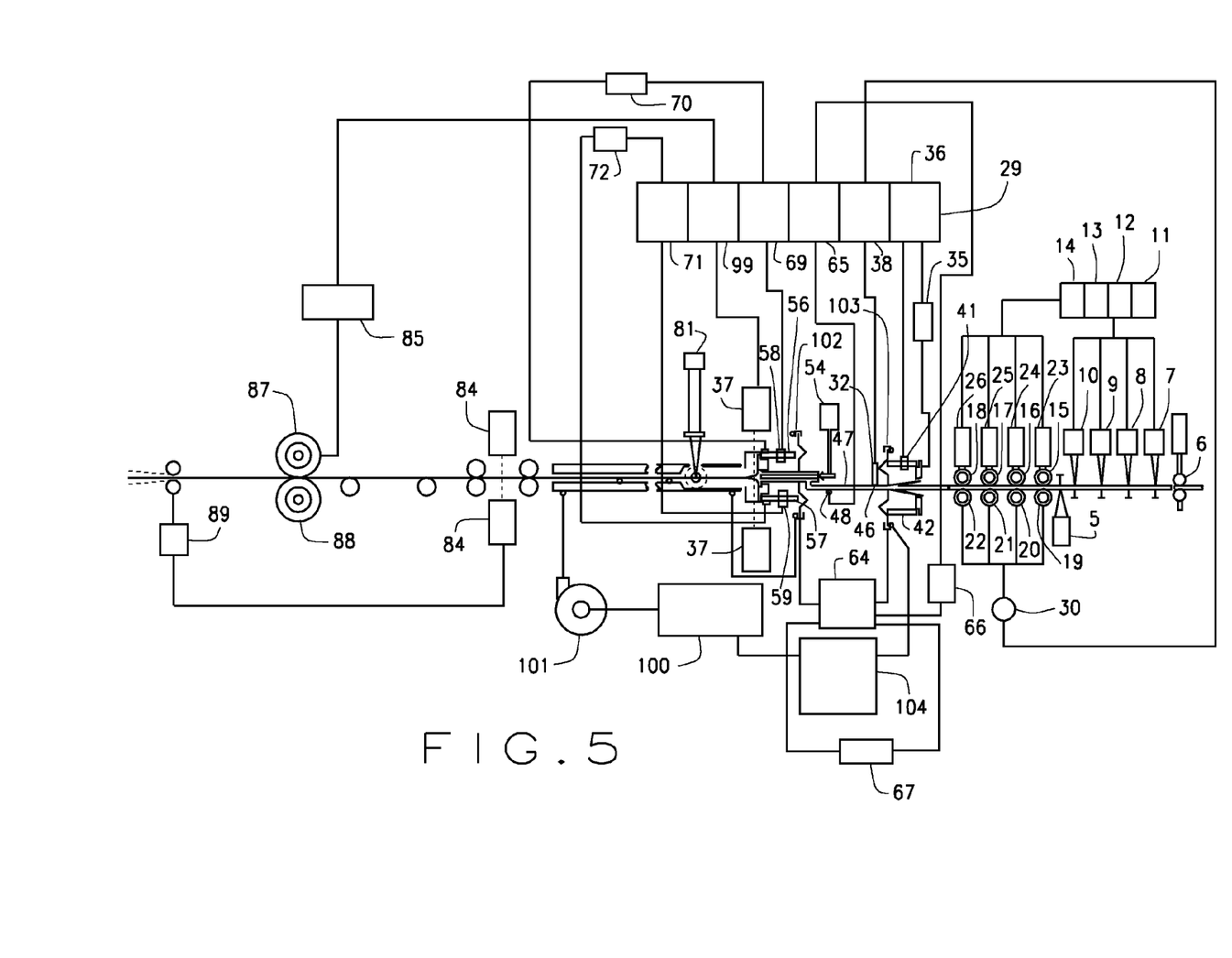
FIG. 5 is a somewhat schematic view of the apparatus of FIG. 1, showing control systems and water cooling systems for the illustrative apparatus.
Figure 6:
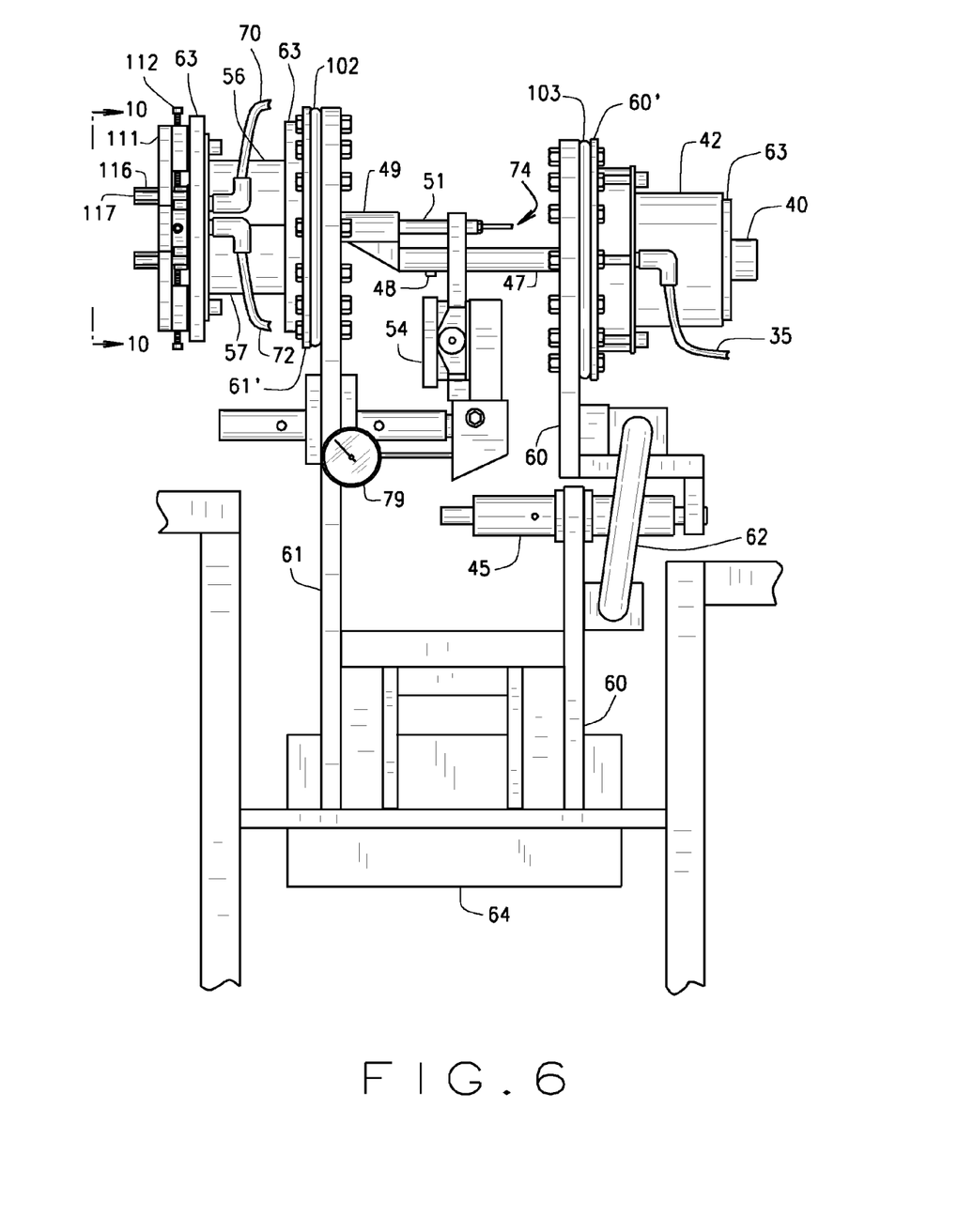
FIG. 6 is a view in side elevation of the melter portion and a die of the forming system of FIG. 1C with insulation removed and without glass in the system.
Figure 7:
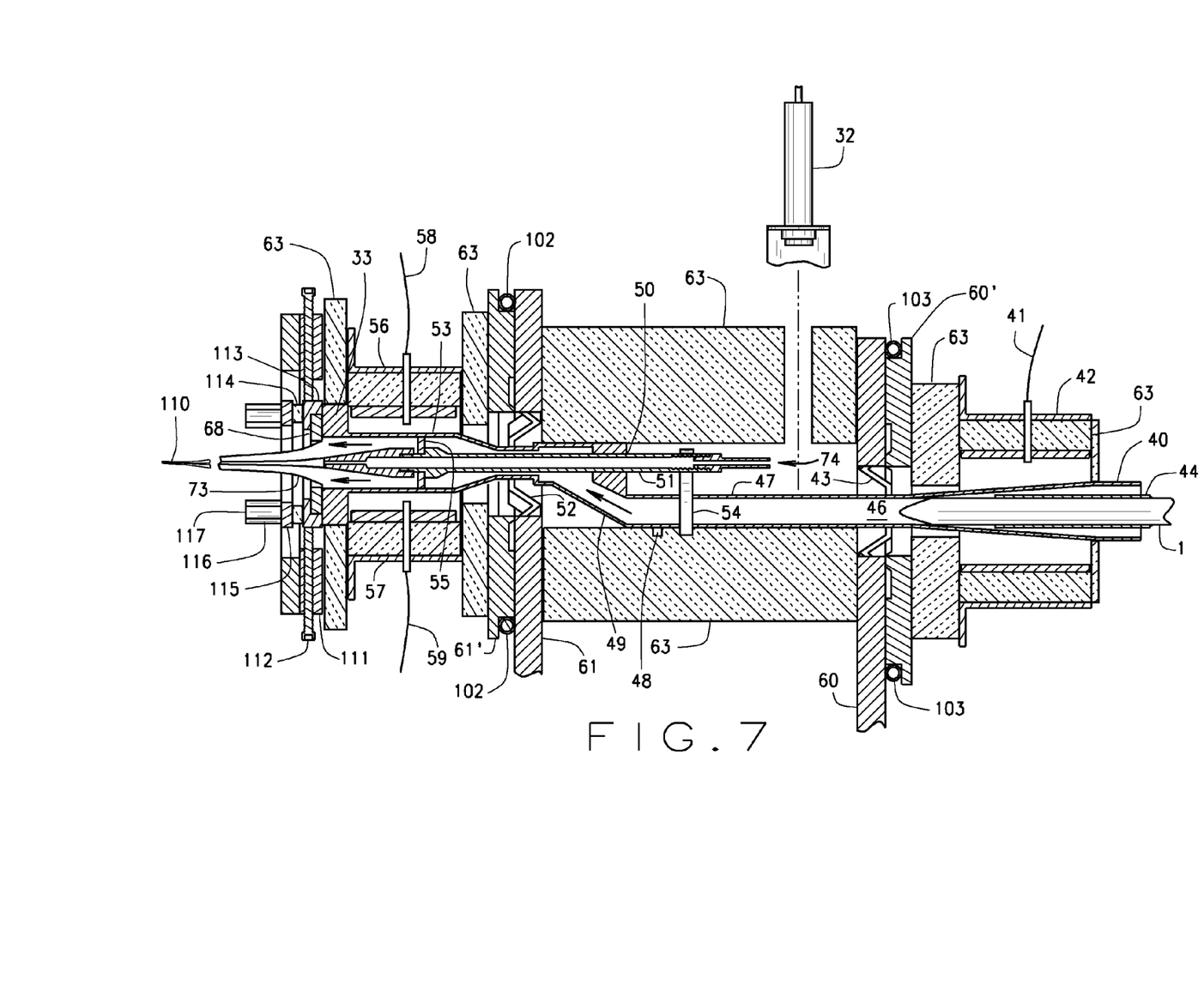
FIG. 7 is a cross-sectional view of the melter and forming portion of FIG. 6.
Figure 8:
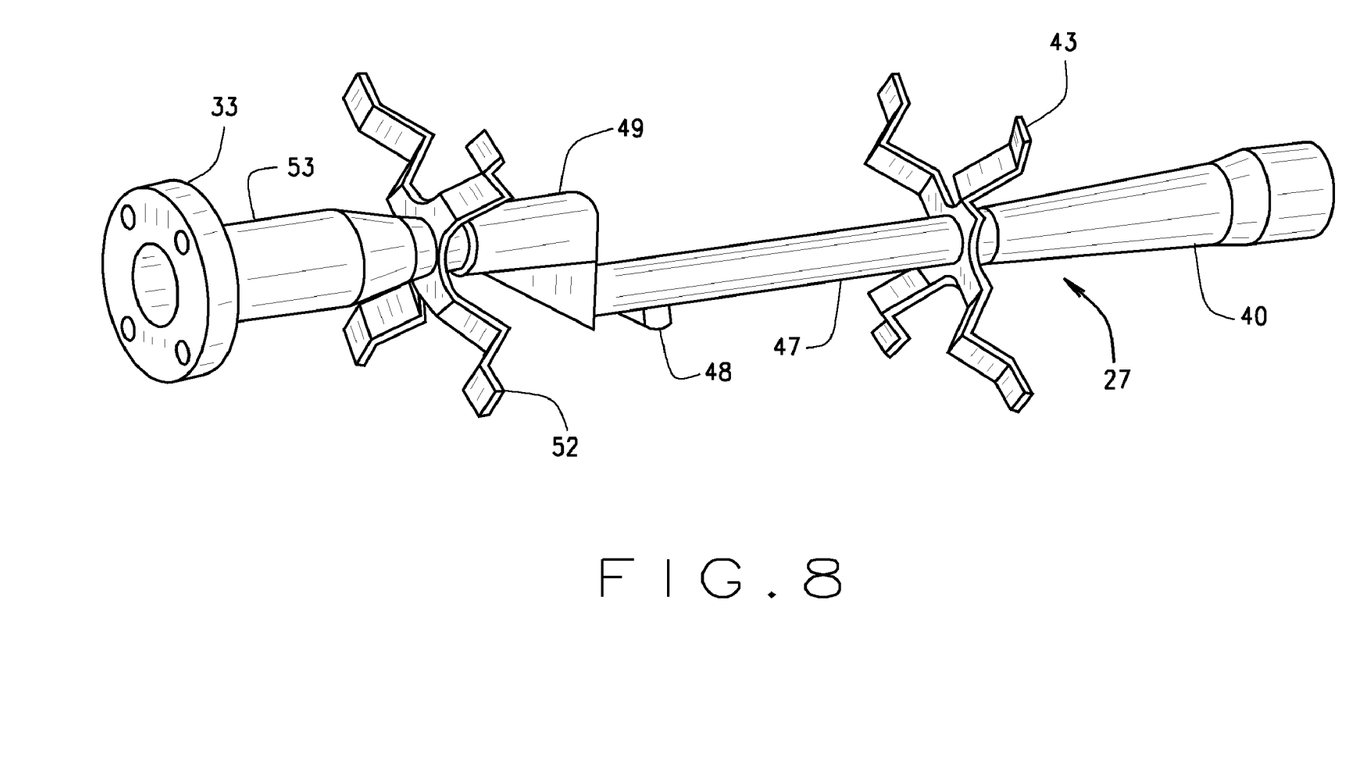
FIG. 8 is a view in perspective of the melter chamber of FIG. 6.
Figure 11:
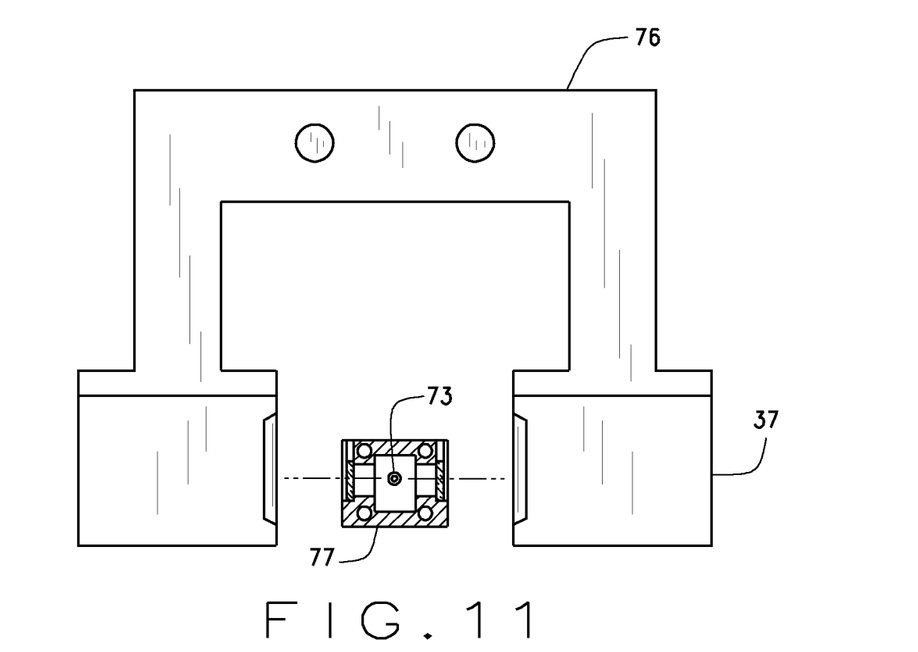
FIG. 11 is a fragmentary sectional view taken along line 11-11 of FIG. 1C of a laser micrometer for use in the illustrative apparatus.
Figure 12:
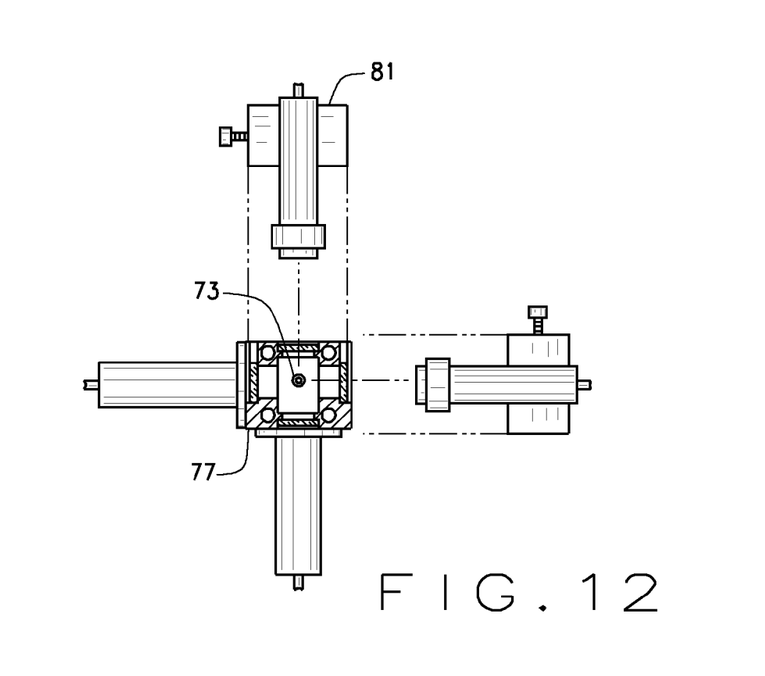
FIG. 12 is a fragmentary sectional view taken along line 12-12 of FIG. 1C of a microscope measuring system for use in the illustrative apparatus.
Figure 13:
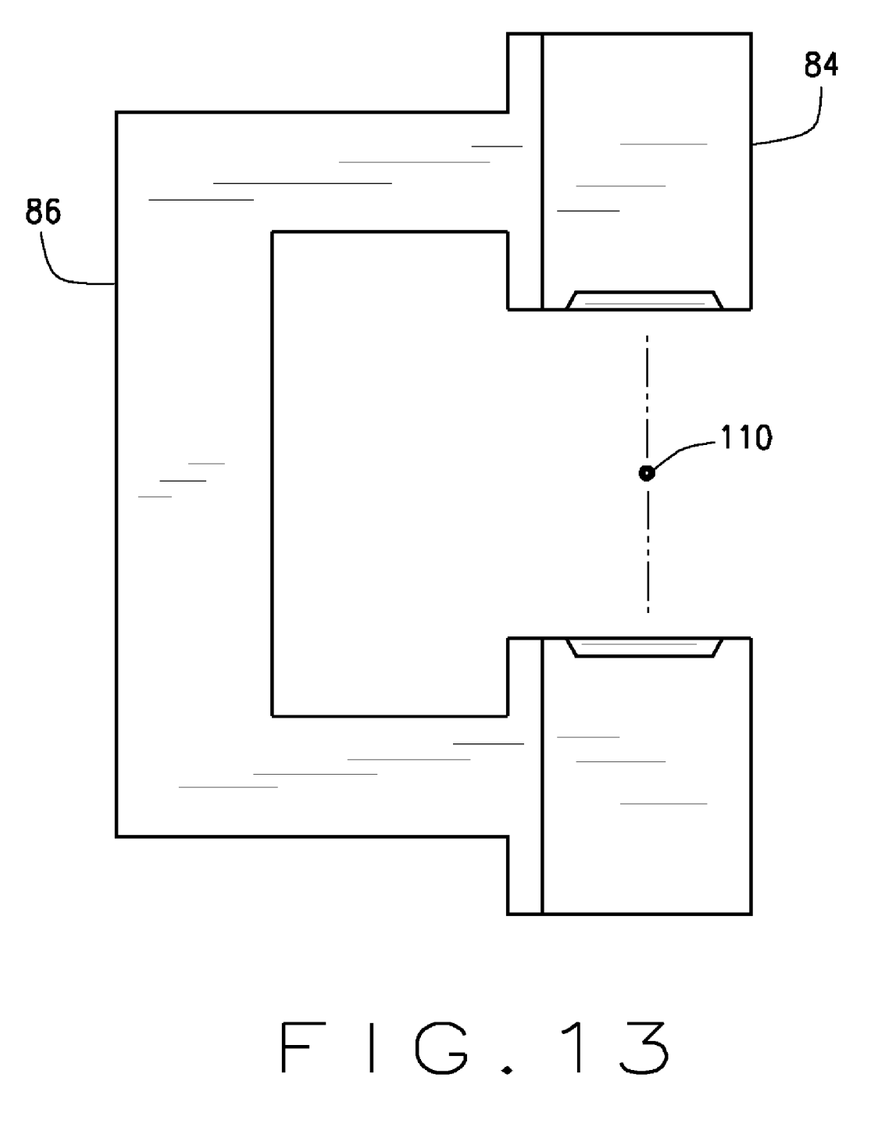
FIG. 13 is a fragmentary sectional view taken along line 13-13 of FIG. 1D of another laser micrometer for use in the illustrative apparatus.

As described in more detail hereinafter, FIGS. 1A and 2 show a rod holding portion of the illustrative apparatus A, into which commercial quality glass rods 1 are loaded manually for feeding with minimal force into a rod feeding portion of the apparatus A, shown in FIGS. 1B, 3, 4, and 4A. The rod feeder portion feeds rods 1, butted end-to-end, with controlled speed or force, and without breaking the ends of butted rods 1, into a melting chamber and forming system portion of the apparatus. The melting chamber and forming system portion is shown in FIGS. 1C, 6, 7, 8, and 10. This portion includes a melter 27 which includes an inlet funnel section 40, a restriction area 46 which forms a semi-molten glass seal with the rod 1 as it melts, a melting tube 47 which includes and forms an extension of the restriction area 46, a transition block 49 which supports an inner forming tube 51 in an offset outlet tube 53, an outlet flange 33, and electrodes 43 and 52. A temperature sensor 32, in the form of a pyrometer, is directed at the melting tube 47 through a small opening in an insulative jacket 63 around the melter 27. Thermocouple 41 monitors inlet temperature, thermocouple 48 monitors melting tube temperature, and thermocouples 58 and 59 monitor outlet temperature. A die 68 is adjustably mounted to the outlet flange 33 by support structure 111-117. A draw down 73 of semi-molten glass emerging from the die 68 is measured by parts of the forming system shown in FIGS. 11 and 12 as it is pulled into a shape 110, illustratively small diameter tubing, by a pulling system portion of the apparatus as shown in FIGS. 1D and 13. The pulling system portion also cuts the tubing into sections. The operation of each portion of the illustrative apparatus is controlled by a control system 29 shown in FIG. 5. The control system 29 may, if desired, control the operation of the rod feeding system, the speed at which the rod 1 is fed into the melting chamber, the speed at which the tubing 110 is pulled from the forming system, the temperature of zones within the melting chamber, and the rate of cooling of the draw down 73 and tubing 110. Adjustment of these parameters allows unprecedented control of the finished shape 110, as do physical adjustments of the die 68 and the inner forming tube 51.

In FIG. 1A, reference numeral 1 designates a solid, round glass rod cut to lengths with square ends being fed to the rod feed system. Roller guides 2, 3, and 4 support the incoming glass rod and hold it on the center of the rod holding system as the rod is being pushed forward by motor driven roller 6. The rod end activates photocells 7, 8, 9 and 10 as it passes by each cell to start timers 11, 12, 13 and 14, respectively. These timers signal air cylinders 23, 24, 25, and 26 in the rod feed system of FIGS. 1B, 3 and 4 to lift momentarily and sequentially to allow the rod ends to pass through pinch rollers 15, 16, 17 and 18 and drive rollers 19, 20, 21 and 22, so that rod ends will not crack during their passage through them. FIG. 4A shows the first pinch roller 15 raised to allow a rod end to pass through it, while pinch roller 16 continues to drive the lead rod 1. Because only one pinch roller is raised at a time, the remaining rollers will continue to drive both the rods 1 toward the inlet funnel 40. Air cylinders 23 24, 25 and 26 that are controlled by electric solenoids and air pressure regulators activate the pinch rollers. Pinch and drive rollers are driven by motor 30 through right angle gear boxes 31. End of rod detector 5 is a photocell that gives an alarm when the end of the glass rod 1 is reached, in order for the next rod to be loaded into the rod holding system. The output voltage of controller 38, which is connected to temperature sensor 32, controls the speed of these rollers.

As the rod 1 is fed into the inlet funnel 40 it begins to soften. As it enters the restriction area 46, the outer portion of the rod forms a semi-molten ring which forms a seal with the melting tube 47. Because incoming glass in contact with the melting tube 47 cools it, instantaneous changes in the temperature of the tube are indicative of instantaneous changes in the mass of the glass rod being fed into the melting chamber. It has been found that by placing a temperature sensor 32 on the outside of the melting tube 47 near restriction area 46, a signal through controller 38 can adjust the speed of motor 30. This controls the feed rate of the rod, and consequently, assists in the precise control of the final product dimensions. The precise position of the temperature sensor 32 may be varied somewhat around the restriction area 46.

Glass rod 1 is guided into the upstream end of inlet funnel tube 40 by center guide sleeve 44, which is held by bracket 39. Inlet funnel tube 40 is also held in place by bracket 39, which is locked in place after melting tube 47 is at running temperature and will not undergo any more thermal expansion.

Inlet funnel tube 40 is heated by muffle furnace 42 and its temperature is controlled by thermocouple 41 in combination with controller 36 and SCR 35. This preheats the glass rod 1 before it enters the restriction area 46.

There are four strap electrodes 43 set 90° apart and four strap electrodes 52 set 90° apart that are connected to main power electrodes 60 and 61 coming from transformer 64. The main power electrodes are insulated from each other except through the body of the melter 27. The contact ends of strap electrodes 43 and 52 are clamped by plates 60' and 61' to main power electrodes 60 and 61, respectively, and are cooled by water flowing through cooling rings 103 and 102, respectively. The current between the electrodes 43 and 52 through the body of the melter 27 raises the temperature of the melting tube 47, transition block 49, and the upstream portion of the outlet section 53 by resistance heating. Strap electrodes 43 at the inlet end are made narrower than strap electrodes 52 to establish a thermal gradient between the ends of the melting tube 47. Thermocouple 48, controller 65, and SCR 66 control transformer 64. Constant voltage power supply 67 prevents sudden line voltage changes from affecting melting tube 47 temperatures.

The inlet of the melting tube 47 is tapered at restriction area 46 at a conical angle of about 1° (included angle of about)2°, and the remainder of the melting tube 47 is of uniform inside diameter. Both the downstream end of the restriction area 46 and the melting tube 47 are smaller in diameter than the smallest rod that will be fed into the system.

The melting tube 47 is resistance heated by transformer 64 between main power electrodes 60 and 61. The wall of melting tube 47 is approximately 30% thicker than restriction area 46 and the downstream end of inlet funnel tube 40 to cause these areas to run hotter than melting tube 47. This makes up for heat loss by the strap electrodes 43, as glass rod 1 is pushed through inlet funnel tube 40 and through restriction area 46.

Insulation 63 is used on the melting tube and throughout the melting and forming system to thermally insulate warm areas. Ball bushing 45 allows melting tube 47 to expand and contract with temperature changes. Flexible electrical cable 62 allows main electrode 60 to be split so that it can move with expansion and contraction as well.

The inlet funnel tube 40 preheats the glass rod 1 sufficiently to soften the exterior portions of the glass rod 1 upstream of the restriction area 46. The restriction area 46 helps maintain the glass rod 1 on center. The restriction area 46, which has a reduced section about 0.5% to about 5% smaller in diameter than the smallest round glass rod 1 being fed to the inlet funnel tube 40, melts the rod and forms a continuous seal between the rod and the wall of the melter 27. A small ring of molten glass forms on the upstream side of the restriction area 46. That ring is continuously drawn through the restriction area 46 by the relatively cool glass rod 1, thereby reducing entrainment of air by the rod. The continuous seal formed between the glass rod 1 and the restriction area 46 also prevents flow of glass from the melting chamber back into the inlet funnel tube 40 and allows for relatively high pressures to be built up in melting tube 47 and outlet section 53. The pushing force of the incoming rod 1, typically about fifty pounds (twenty-three kilograms), causes pressure in the melting tube 47 and the outlet section 53. This pressure prevents expansion of any trapped air in the molten glass and reduces or prevents the formation of air bubbles or airlines in the finished product. It has also been found that placing the inlet section of the melting tube 47 below the outlet section 53 helps to minimize air bubbles in the finished tube.

By cooling outlet section 53 and die 68, the pressure in the melting system allows the viscosity of the extruded glass to be high enough so that gravitational forces acting on the horizontal glass do not cause any significant sag or deformation of the finished product.

A hollow inner forming tube 51 is positioned in the outlet section 53 of the melting system. The inner forming tube 51 is formed of a drawn hollow tube having a shape machined in a screw-on tip at its downstream end. The downstream section of the inner forming tube 51 is positioned within the die 68 and forms the bore of the draw down 73 and thus of the final glass tube 110. As used herein, the term "draw down" describes the semi-molten shape of glass emerging from a melter portion of the invention. The draw down in the preferred embodiment is a hollow shape emerging from the die 68 at the outlet of the section 53 and having a ratio of inner dimension to outer dimension generally the same as the finished glass tube produced by the preferred process and apparatus of the invention.

The downstream end of the inner forming tube 51 is preferably positioned near the outlet orifice of the die 68. The inner forming tube 51 communicates with the atmosphere through its upstream open end. The upstream end of the inner forming tube 51 can also be connected to a pressure/vacuum source 74 to affect the shape or dimensions of the final product. If desired, other fluids than air can be connected to the upstream end of the inner forming tube 51 to affect the characteristics of the final product 110. The upstream end of inner forming tube 51 is connected to actuator 54 through a gland 50 in the transition block 49.

Gland 50 is kept at a semi-molten temperature that will not leak glass, but still allows motion of the inner forming tube 51. Inner forming tube 51 is supported near its open upstream end by actuator 54 and is supported inside the outlet section 53 by inner forming tube spokes 55. Actuator 54 can move inner forming tube 51 radially through semi-molten gland 50 to position the inner forming tube 51 on the center of die 68 and also longitudinally as shown by dial indicator 79 to control relative sizes of the inner diameter (ID) and outer diameter (OD) of the glass extruding from die 68. Inner forming tube 51 can also be rotated for alignment of non-circular cross-sections. The gland 50 is typically formed by an opening in the wall of the transition block 49 about 0.02 to 0.1 mm larger than the outer diameter of the inner forming tube 51. Because of the thickness of the wall in which the gland 50 is formed, the temperature of the gland is somewhat cooler than the average wall temperature of the melter 27.

The temperature of outlet section 53 is controlled by split clamshell furnaces 56 and 57, thermocouples 58 and 59, controllers 69 and 71 and SCR 70 and 72. The two furnaces are split so that different temperatures can be set above and below outlet section 53 to adjust the shape in the draw down 73.

Die 68 can be adjusted by using yoke 111 and yoke pins 112 to push the die in the horizontal and vertical directions. Once die 68 is adjusted, it is clamped in place with holder 113, ceramic spacer 114, end ring 115 and nuts 116. These nuts are threaded on shafts 117 that protrude from the outlet flange 33.

The laser micrometer 37 measures draw down 73 and is held by bridge 76 on opposite sides of glass covered draft box 77. Bridge 76 can be moved by screw assembly 78 to position laser micrometer 37 as close as possible to die 68 so that there is minimal delay in seeing changes in the draw down 73 size. Microscopes 81, set at a 90° angle to each other, are used to view the inner capillary bore on microscope display 82 for centering of the issuing glass tube 110, and to adjust the relative size of the inner capillary bore by manipulating actuator 54 and moving inner forming tube 51 while the machine is in operation and gland 50 is hot.

Draft box 77 shields the issuing glass from air disturbances, while allowing viewing by laser micrometer 37 and microscopes 81. Split hinged water cooled box 83 prevents drafts from disturbing glass dimensions before it has set to final size as it is being pulled by upper pull roller 87 and lower pull roller 88. Laser micrometer 84 is used to sense the final outer diameter of glass tube 110 as the glass is being pulled through vertical guide rollers 105 and horizontal guide rollers 106. Laser micrometer 84 is held by bridge 86 on opposite sides of glass tube 110. Output from laser micrometer 84 and/or laser micrometer 37 can be used to sort glass tube 110 appropriately in a glass cutting/sorting system 89. Cutting and sorting systems are well known in the art. A score-and-crack cutting system has been found to be operative.

The pull roller system (FIG. 1D) is operated so that pull roll motor 85 drives upper pull roller 87 and lower pull roller 88 at the same speed while they hold the glass tube 110 being pulled. Laser micrometer 37 monitors the size of draw down 73 and sends a signal to controller 99 to vary the speed of the pull rollers to keep a final fixed dimension of the glass tube 110.

Constant temperature water cooling comes from tank 100 and pump 101 through split hinged water cooled box 83 to electrode cooling ring 102 to electrode cooling ring 103 and back to chiller 104 and to tank 100 for constant temperature conditioning and back to pump 101.

The five process instruments are Honeywell UDC-3300 Digital Controllers, Fort Wash., Pa. The motors and actuators are Aerotech, Pittsburgh, Pa. The laser micrometers are Keyence LS-5000 series made by Keyence Corporation of America, Woodcliff Lake, N.J. The temperature sensor is a pyrometer from Engelhard, Fremont Calif. There are several manufacturers who make this type of equipment so those mentioned are not unique.

Illustrative methods of continuously forming high precision glass tube with the illustrative apparatus A was carried out as follows.

For process development purposes, all metal parts that were in contact with molten glass were made of 310 stainless steel made by Rolled Alloys, Temperance, Mich.

The glass rod feed stock was 11 mm SG 10 glass, made by Sylvania, Versailles, Ky. Outer diameter tolerance was ±0.15 mm The small end of the inlet funnel tube 40 on the melter was 11.5 mm in diameter, and the restriction area 46 was 10.79 mm in diameter. The outlet die 68 diameter was 12.50 mm, and the inner forming tube 51 was 1.0 mm in outer diameter at its downstream end, 6.3 mm in outer diameter through most of its length, and 0.63 mm in inner diameter through its entire length.

After heating the machine to start feeding glass rod through the inlet funnel tube 40 with input furnace at approximately 900° C., the rod was fed at a sufficient rate to make 1.25 mm O.D. tubing with a 125 micron I.D. bore at a pull rate of eight meters per minute. The glass melting tube 47 was approximately 1050° C., the split clamshell furnaces 56 and 57 were approximately 1020° C. and the finished tubing had size tolerances within those required for fiber optic glass ferrules. The current between the main power electrodes 60 and 61 is about 1500 amps at 1.5 volts.

The adjustments to the position of the inner forming tube 51, taken with the rate at which the glass rod 1 is pushed, the rate at which the final glass tube 110 is pulled, and the temperature of the melting chamber outlet section 53, give unprecedented control of the dimensions, roundness and concentricity of the final glass tube 110.

The method and apparatus of the present invention have numerous advantages over redraw techniques. They can reduce the cost of manufacture by 90% or more. The use of a high pushing force with the glass rod 1 (above about five kilograms, preferably about fifteen to forty kilograms) allows glass to be made continuously without airlines, and gives much closer dimensional control and sharper shapes than redraw. Square corners and flat surfaces are easily formed. Double and multiple bore shapes can be continuously formed in this one-step process as opposed to the many steps and complications of other inventions such as the process suggested by aforementioned U.S. Pat. No. 6,810,691. The method and apparatus provide the ability to run continuously from a source of glass rod such as made by the well-known Vello process and eliminates the problems caused by welding rods or performs together. It will be understood, however, that the relatively inaccurate rods formed by the Vello process may, if desired, be welded together to form a continuous glass feed, or the rods may, if desired, be reformed to closer dimensions by melting and extruding them from a die. Because the present invention can position both the incoming glass rods and the finished tube horizontally, it can eliminate the need for drawing towers. This invention can also be positioned vertically or at any angle in a tower for glass production if desired.

As numerous variations will be apparent to those skilled in the art, the foregoing disclosure is to be understood as exemplary and not as limiting the scope of the invention, whose scope is to be determined solely by the following claims.

Merely by way of example of changes that could be made, other types of glass may be utilized. To produce tubing from 7740 Borosilicate glass, a platinum alloy such as PT-20RH is preferred for all the metal parts that come into contact with molten glass, and the temperatures on the various parts of the apparatus as stated above would all be increased by somewhat more than 200° C. In the same manner, for quartz products and other high temperature applications, approaching 2000° C., iridium or other refractory metals such as molybdenum or tungsten can be used as the material for the metal parts. A glove box or nitrogen curtains can be used to contain the atmosphere around the melting chamber portion of the system if needed.

Figure 9A:
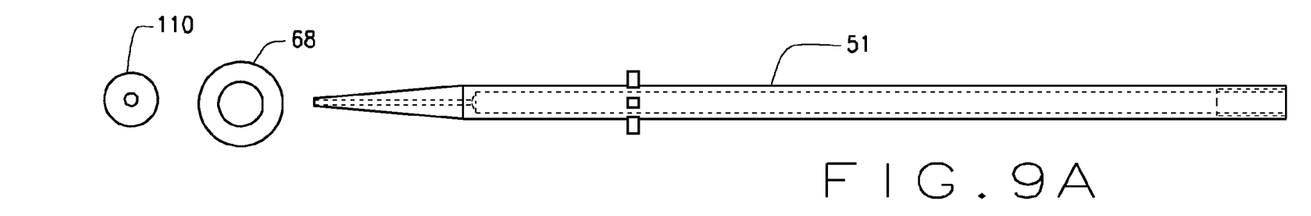
FIG. 9A is a view in side elevation of an alternative embodiment of a cylindrical inner forming tube, a view in end elevation of a die for use therewith, and a view in end elevation, not to scale, of a drawn shape formed therewith.
Figure 9B:
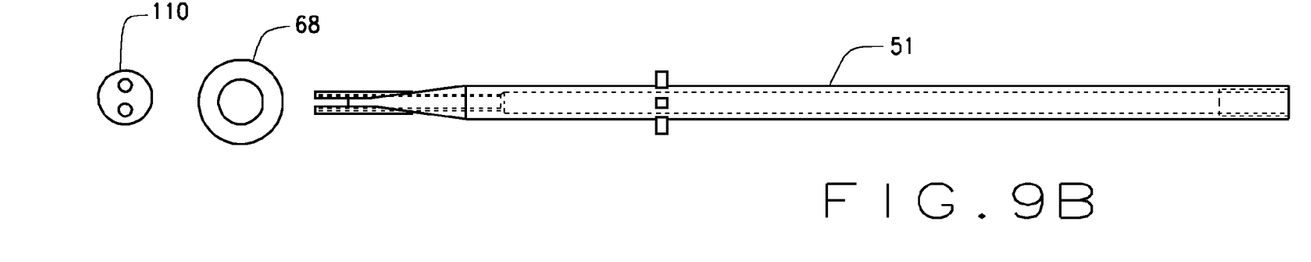
FIG. 9B is a view in side elevation of an alternative embodiment of a multiple-hole inner forming tube, a view in end elevation of a die for use therewith, and a view in end elevation, not to scale, of a drawn shape formed therewith.
Figure 9C:
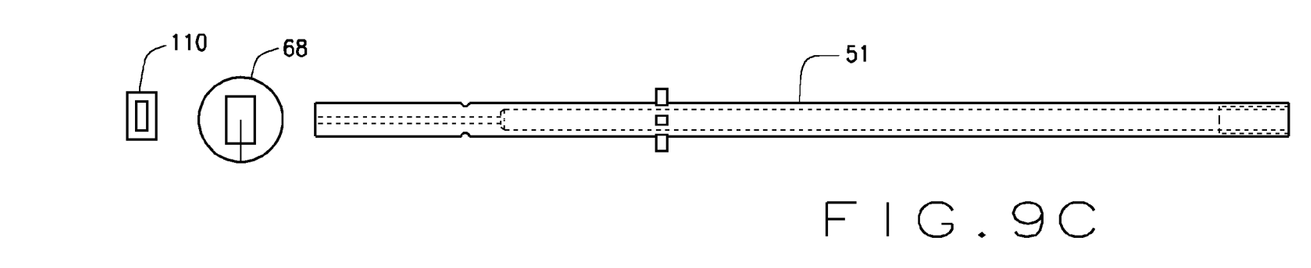
FIG. 9C is a view in side elevation of an alternative embodiment of a rectangular inner forming tube, a view in end elevation of a die for use therewith, and a view in end elevation, not to scale, of a drawn shape formed therewith.
Figure 10:
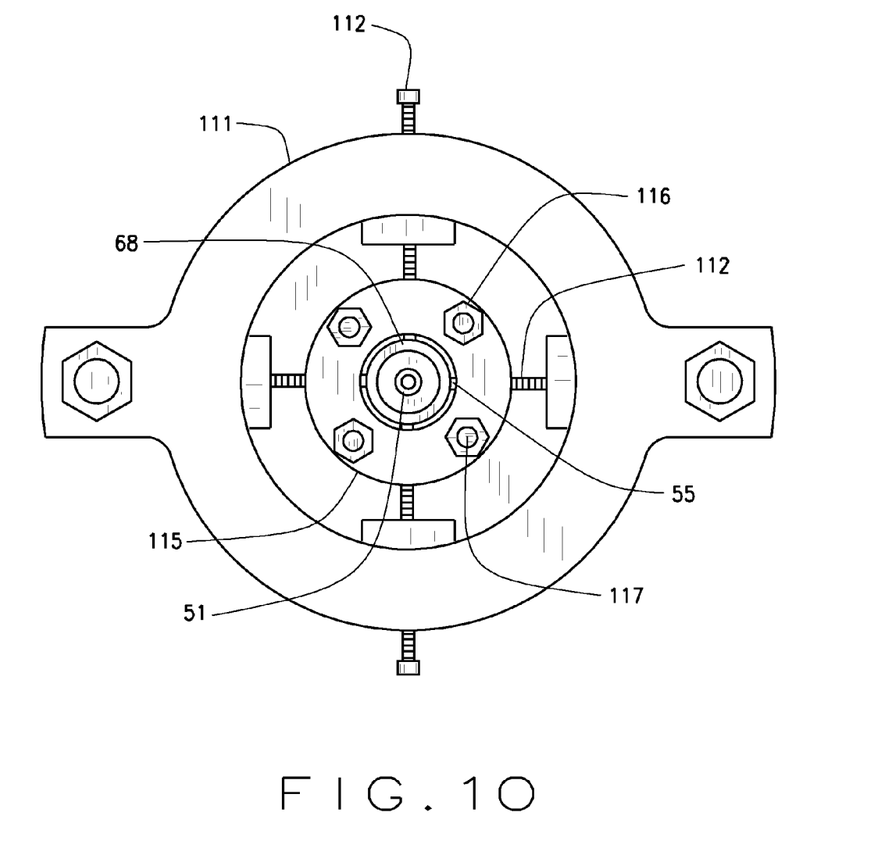
FIG. 10 is a fragmentary view in end elevation of the melter portion of FIG. 6, taken as indicated by the line 10-10 of FIG. 6.

As shown in FIGS. 9A, 9B, and 9C, the shape formed by the illustrative apparatus can easily be changed by changing the die 68 and inner forming tube 51, and the inner forming tube may be formed as a single piece. The size of the rod 1 and the size of the shape 110 can be varied widely.

The ratio of the outside diameter to inside diameter of the tubing produced by the example was primarily for illustrative purposes and not to limit in any way what this ratio might be on any particular production run. Other shapes, such as rectangular tubing may be produced with a rectangular die 68 and rectangular inner forming tube 51 as shown in FIG. 9C. Eliminating or moving rearward the inner forming tube 51 may form solid glass rods of any cross section formed to close tolerances. A cluster of inner forming tubes 51 may also be utilized to produce product with multiple lumens as shown in FIG. 9B. Such a cluster could be of different diameters as well as the same diameter. This approach makes possible the production of a wide variety of photonic band gap or photonic crystal fibers and multiple-fiber connectors.

Tubes or rods of continuously varying diameters, with any desired taper, may be formed by periodically changing the feed rate and/or the pull rate. The relative size of the inner bore of the tube 110 can be varied by systematically periodically moving the inner forming tube 51 forward and back.

Rubber cog belts can replace upper pull roller 87 and lower pull roller 88. By setting the rubber cog belts at an angle to each other in the horizontal plane, the round glass can be caused to rotate as it is pulled from the die, if so desired.

Rubber cog belts or other methods familiar to those skilled in the art could replace the pinch and drive rollers in the rod feed system.

The use of the laser measurement device that responds to glass outside diameter after the glass has solidified may not in all cases be needed. When utilized, a measurement of the finished glass tube may be made at any point after the tube leaves the outlet orifice of the melter. Preferably, the measurement of the inlet temperature is utilized to control the push rate of the feed rod, and measurement of the finished tube is utilized to control the pull rate on the tube. It will be understood, however, that either of these measurements can be utilized for either purpose or both, and algorithms will immediately occur to those skilled in the art for mixing the measurement signals to control both push rate and pull rate. Because the system has very little hysteresis, the amount of control required is greatly reduced. It will further be understood that although it is highly desirable to maintain the temperature of the melting chamber constant, it is possible to adjust both push and pull rates to compensate for variations in temperature. For looser tolerances on the final product, rod feed speeds, melting chamber temperatures and pull roller speeds can be set manually with no feedback control. If higher precision is required, the input glass rod 1 can be ground to close OD tolerances.

The glass size measuring and control system may use other than lasers to control the final glass size. The system may use various temperature sensors such as thermocouples and pyrometers interchangeably to sense and control the temperatures throughout the device.

The glass melting and forming portions of the apparatus can be heated by not only by resistance heating, but also by radiant, induction heating or by other methods known in the art to produce a desired temperature profile or gradient.

The glass cutting/sorting portion 89 of the pulling system can use several methods known in the art, including by way of illustration flame cutting, laser cutting, and diamond sawing.

Die 68 may be formed in various shapes other than such as the preferred plate, such as a cone or a tube to form the outside dimensions of the product.

The center guide sleeve 44 may be eliminated or replaced by guide rollers. The shape of the inlet funnel tube 40 may be varied to accommodate the shape of the feedstock and the amount of pre-heating required.

Motors throughout the system may be servo, stepper or various types capable of providing consistent rotation speed and control.

The diameter of the rod at the restriction area 46 may be determined in other ways. For example, a strain gauge mounted to the restriction or its mountings could be utilized to measure the pushing force of the glass rod 1. The torque required to drive the glass rod 1 may also be utilized to determine the size of the rod at the restriction. The diameter of the glass rod 1 may be directly determined at a point before the restriction, as by an array of laser interferometers, and the rate of feed varied in accordance with the predicted time of arrival (using a shift register) of variations in diameter at the restriction. The illustrative method of measuring temperature at the restriction is a more direct way of determining mass at the inlet of the chamber, however, and is therefore presently preferred.

Although the illustrative machine preferably utilizes glass, it will be understood that in principle the machine and method may be used for forming any heat-softenable material.

These variations are merely illustrative.

The invention claimed is:

1. A method of forming a continuous glass tube of controlled cross-section, the method comprising pushing a solid glass rod into a melting chamber, melting the rod in the chamber, extruding molten glass in the chamber through a die to form a draw down, and pulling the glass draw down to form said tube, the process further comprising determining changes in a diameter of the solid rod, and controlling at least one of a rate of pushing the rod and a rate of pulling the glass draw down in response to changes in the diameter of the rod.

2. The method of claim 1 wherein the rate of pulling the glass draw down is controlled in response to changes in the diameter of the rod.

3. The method of claim 1 further comprising measuring at least one process variable selected from the group consisting of a dimension of the draw down, a dimension of the tube, a temperature of at least a part of the melting chamber, and a pushing force on the rod, and controlling at least one of the rate of pushing the rod and the rate of pulling the glass draw down in response to the measured variable.

4. The method of claim 1 wherein the rod and the tube are both substantially horizontal throughout the method.

5. The method of claim 1 wherein the tube is round.

6. The method of claim 1 wherein the tube is rectangular.

7. The method of claim 1 wherein the melting chamber has a single inlet and a single outlet.

8. The method of claim 7 wherein the inlet has a diameter smaller than the diameter of the rod, forcing the glass rod through the inlet producing a softened glass seal at the inlet and producing pressure within the melting chamber.

9. The method of claim 8 wherein the rod is fed continuously to the inlet of the chamber with sufficient force to produce a pressure in the chamber which suppresses formation of air bubbles or air channels in the glass in the chamber.

10. The method of claim 7 further comprising a hollow inner forming tube extending from the vicinity of the outlet through a wall of the chamber, the method comprising drawing air through the inner forming tube to form a glass tube.

11. The method of claim 10 wherein a wall adjacent the inner forming tube is cooler than an average wall temperature of the melting chamber.

12. The method of claim 1 wherein a temperature at an inlet of the melting chamber is measured.

13. The method of claim 12 wherein the step of controlling the rate of pushing the rod maintains a constant mass per unit time of the material passing through the inlet.

14. The method of claim 1 wherein the glass is quartz.

15. The method of claim 1 wherein changes in the diameter of the rod are detected by changes in temperature at an inlet side of the chamber.

16. The method of claim 1 further comprising heating the chamber by current flowing through a wall of the chamber and through spaced electrodes electrically attached to the wall of the chamber.

17. The method of claim 16 wherein portions of the wall of the chamber are formed of different thicknesses to produce a desired temperature profile within the chamber.

18. The method of claim 1 wherein the glass tube cross-section has tolerances for inside and outside dimensions of one hundred nanometers or less.

\* \* \* \* \*